Sept. 27, 1949.  R. E. PRENTICE  2,483,232

SHUTTER RELEASE FOR FOLDING CAMERAS

Filed May 29, 1946

INVENTOR.
RUSSELL E. PRENTICE

BY
ATTORNEYS

Patented Sept. 27, 1949

2,483,232

UNITED STATES PATENT OFFICE 2,483,232

SHUTTER RELEASE FOR FOLDING CAMERAS

Russell E. Prentice, Dexter, Mich., assignor to General Aniline & Film Corporation, New York, N. Y., a corporation of Delaware Application May 29, 1946, Serial No. 673,087

1 Claim. (Cl. 95—53)

This invention relates to shutter release mechanisms for cameras of folding type, such as the well known press cameras.

It is an object of the invention to devise a release mechanism for camera shutters for a type of camera which has a folding front, and in which the focusing of the lens is accomplished by a knob at the forward end of the lens supporting bed, in which the shutter may be tripped by the hand as it grips the focusing knob.

It is another object of the invention to devise a shutter release mechanism for cameras of the type mentioned, in which release shall be effected by the photographer's hand as it grips the focusing knob, and in which the motion is conveyed to the shutter through mechanism effective no matter what position the lens may occupy, that is, for different focusing positions or for different positions occupied by the lens, as the same is employed at different focal lengths.

Other objects of the invention will be apparent from the following disclosure.

In folding cameras, such as press type cameras, the camera case is opened by dropping the so-called bed to a more or less horizontal position. The camera is otherwise made ready for action by withdrawing the lens carrier and bellows to a position along the bed, certain stops being provided for limiting the movement as is well known to those skilled in the art. With such cameras, the shutter is frequently released by a cable in which event it is necessary to remove the hand from the focusing knob after focusing and to concentrate attention upon the cable release. This practice involves holding the camera with both hands during focusing so that one hand may be employed to steady the camera by the focusing knob at the same time this knob is being turned to focus the lens. Then, when the greatest steadiness is desirable, the hand which did grip the focusing knob is removed, and is employed to actuate the shutter release. Sometimes, when a long release cable is used which the photographer attempts to hold between his fingers while focusing, an attempt has to be made to retain a grip on the knob while pressing the cable release. At best this procedure is rather awkward, and involves the added difficulty that the long release cable is not so easily disposed of when the camera is closed.

According to the invention herein described and claimed, a release button or shutter actuating member is positioned close to the focusing knob, and since this member is permanently built into the camera mechanism, the shutter may be released at any convenient time while the photographer still retains a firm grip on the focusing knob. This improvement avoids groping about to find the end of a release cable after letting go of the focusing knob, and permits steady holding at the time of snapping the picture. The actual mechanism comprises, among other parts, a pivoted plate running along the length of the bed, hinged in such a manner as to be tipped upwardly when the release button is pushed throughout a short distance. The shutter has permanently connected thereto a short release cable which extends down at the side of the lens carrying mechanism, and is clamped in position at the side of that mechanism so that the release plunger extending from the cable is contacted by the pivoted plate as it is tilted upwardly.

The plate extends in a direction parallel with the movement of the lens carrier along the bed and, therefore, the shutter is equally affected by the tilting of the plate no matter what active position the lens may occupy. Of course, in this type camera, the lens is frequently used at different extensions, thereby making possible the taking of pictures at the normal focal length of the lens or for larger images or close-ups at a much longer focal length. The invention will be described in greater detail by reference to the accompanying figures of drawing, in which.

Figure 1:
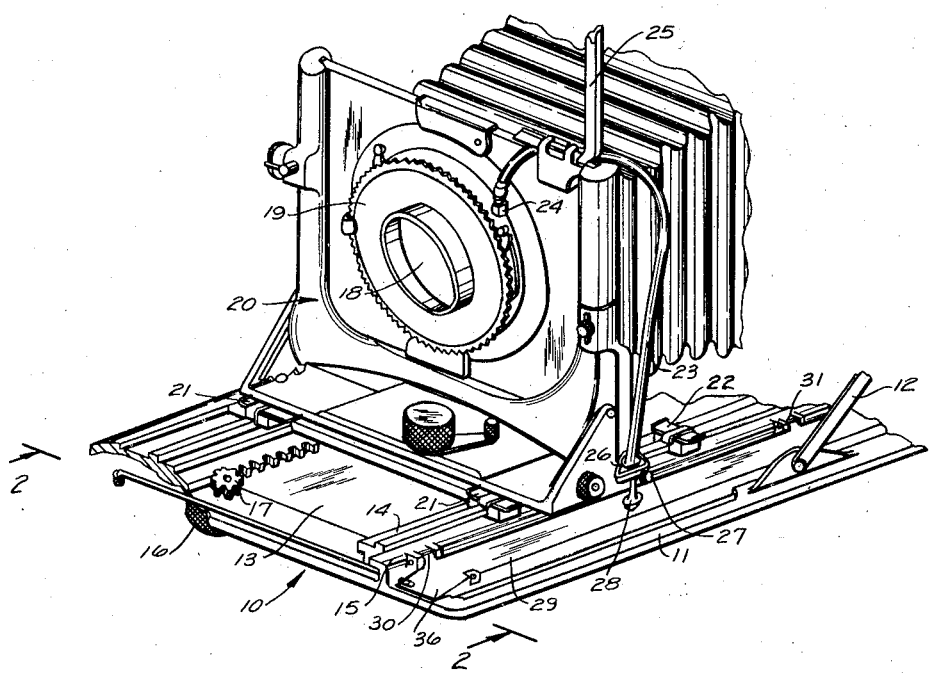
Fig. 1 is an isometric view of so much of a press type camera as is necessary to illustrate the shutter release mechanism and its relationship to other parts of the camera.

Now referring to the figures, the camera includes, among other parts, a bed generally indicated by numeral 10 which has the usual outer portion 11 hinged to the camera casing. This bed is capable of being dropped to a more or less horizontal position and is maintained in that position by braces, one of which is indicated by numeral 12. The bed portion also includes a slidable portion 13 having tracks 14 guided within the ways 15 which extend lengthwise of the member 11. The movable part of the bed 13 may be racked inwardly or outwardly throughout a short extent by turning a knob 16 known as the focusing knob. Movement is imparted to the bed by a system of small gears, such as gear 17, engageable with a rack extending along the length of the movable bed 13.

A lens 18 mounted in a shutter designated by numeral 19 is retained in position by the lens carrier generally indicated by numeral 20. As is well known to those skilled in the art, the lens carrier may be slid along the tracks 14 as it is withdrawn from the camera casing, and may be positioned and temporarily locked at appropriate points along the track depending upon the focal length at which it is to be used. As herein illustrated, there are two sets of track stops 21 and 22. These stops are adjustable and effective for stopping the lens at either one of two different positions, one position corresponding to the normal focal length for the lens, and the other being effective to stop the lens carrier when the lens is to be used at an extended position for taking close-ups or other photographs at a longer focal length.

The shutter 19 is of the type known as a between-the-lens shutter and may be actuated by a release lever or trigger. Since this method of operation is not frequently employed for cameras of this type, a cable release 23 is threaded into the usual connection 24 and is extended out and in back of the open finder (only part of which is shown at 25) and then downwardly along the side of the lens carrier to be clamped by a triangular clamp member 26 fixed at the lower part of the lens carrier. The cable release is clamped by a screw 27 so that the end of the cable may be quickly fixed in position, or may be detached in the event the camera is to be employed with a tripod or in some other manner when it is desirable to have the cable release extended to the side. The plunger 28 is engaged by the top edge of a plate 29 extending for practically the entire length of the camera bed and being hinged or pivoted at 30 and 31. The adjustment of the cable release in the clamp 26 is such that there is a slight amount of clearance when the plate 29 lies flat against the bed, but when said plate is tilted slightly upwardly as indicated in Fig. 2, the plunger is pushed upwardly and the wire moved through the conduit so as to actuate the shutter tripping means.

For tilting the plate 29, a wire rod 32 extends across the bed being guided within apertures in the ways 15. At one end as seen in Fig. 2, the rod 32 contacts the inner edge of the plate 29, the plate being countersunk or indented at that point for the purpose of receiving the rod. At the opposite end, the rod is bent down as at 33 and is provided with a finger engageable button or grip 34. The bed 11 is slotted as at 35 so that the rod 32 may be moved throughout the required distance necessary for actuating the shutter.

Figure 2:
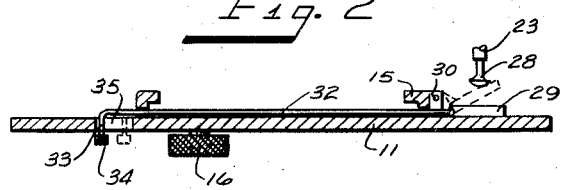
Fig. 2 is a section taken at line 2—2, Fig. 1.

The plate 29 and the rod 32 are normally held in the position shown in full lines, Figs. 1 and 2, by the usual spring tension provided within the release cable 23. If desired, supplementary spring means may be employed so as to prevent any tendency towards accidental release of the shutter. Preferably, the plate 29 is made from very light material, such as aluminum alloy, and, therefore, the spring provided with most shutter release cables is sufficient for the purpose.

When the lens and bellows are pushed into the camera casing for closing the bed, there is no interference between parts. Each end of the plate 29 is beveled as at 36, Fig. 1, so that when the bed is dropped and the camera front again withdrawn, there can be no interference between the plunger and the end of the plate in the event the adjustment of parts within clamp 26 has not been set to provide clearance. In some instances where a shutter may have considerable lost motion in its release mechanism, the setting of the cable release may necessitate a slight compression of the spring in the cable. The bevel at the outer end of the plate may be employed to take care of situations for which some camera beds are provided, that is, extra extensions for using the lens at extremely long focal lengths.

The invention has been described by illustrating and by reference to a camera of the press type. It is to be understood that there are other similar cameras not generally designated by this term but which are of the same general construction and to which the invention may be applied. In some instances, the focusing knob projects out of the side of the bed rather than being located underneath the bed when the same is moved to open position. In that event, the button 34, or a similar finger grip may be so positioned as to be conveniently actuated while having the hand on the focusing knob for focusing and for steadying the camera just as the picture is actually being taken.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claim.

I claim:

In a photographic camera of the folding type having a bed, a lens, a shutter having shutter release means, a lens carrying member slidable along said bed for focusing and means for positioning the lens carrying member for using lenses of different focal lengths, a focusing knob rotatable for moving the lens carrier and lens to maintain critical focus, a shutter release means comprising at that side of the bed opposite the focusing knob, a pivoted plate extending along the camera bed and having its ends beveled directly toward the said bed, a flexible cable release member extending from said plate to the shutter release means within said shutter and clamping means for said release member attached to the lens carrying member adjacent the said pivoted plate, said cable release member comprising a sheath and having a rounded contact member engageable by said pivoted plate when it is swung upwardly, and a tripping member extending laterally across the bed and at the interior side thereof adjacent the lens carrying member when in position and having contact with said plate below the pivot means therefor so that when the tripping member is moved laterally the said plate will be swung about its pivot means, said tripping member having finger engageable means extending downwardly through an aperture in the bed and adjacent the focusing knob so located that it may be moved to trip the shutter while gripping the focusing knob and by the same hand that grips said knob.

RUSSELL E. PRENTICE.

REFERENCES CITED

The following references are of record in the file of this patent:

UNITED STATES PATENTS

| Number | Name | Date |
| --- | --- | --- |
| 2,163,159 | Schwartz | June 20, 1939 |
| 2,182,097 | Schenk | Dec. 5, 1939 |
| 2,282,291 | Whitman | May 5, 1942 |
| 2,319,157 | Polhemus | May 11, 1943 |
| 2,336,396 | Fischer | Dec. 7, 1943 |
| 2,396,889 | Schwartz et al. | Mar. 19, 1946 |

FOREIGN PATENTS

| Number | Country | Date |
| --- | --- | --- |
| 544,161 | Great Britain | Mar. 31, 1942 |